INVENTOR.
William Ward Stevens Jr.
BY [signature]
Attorneys

INVENTOR.
William Ward Stevens Jr.
BY
Attorneys

Oct. 21, 1969 W. W. STEVENS, JR 3,474,427

DATA STORAGE SYSTEM

Filed Nov. 23, 1964 3 Sheets-Sheet 3

INVENTOR.

William Ward Stevens Jr.

BY [signature]

Attorneys

United States Patent Office 3,474,427
Patented Oct. 21, 1969

3,474,427
DATA STORAGE SYSTEM
William Ward Stevens, Jr., Atherton, Calif., assignor to Data Disc, Incorporated, Palo Alto, Calif., a corporation of California
Filed Nov. 23, 1964, Ser. No. 413,170
Int. Cl. G11b 5/00
U.S. Cl. 340—174.1 18 Claims

ABSTRACT OF THE DISCLOSURE

A system for re-locating clocking indicia from an interchangeable data storage disc to a permanently installed disc or other magnetic recording surface synchronously movable with the replaceable data storage disc. After preparing a master clock disc with an appropriate clocking track, the master clock disc is positioned into the apparatus and the master clock track is then copied onto the synchronously moving recording surface, the master disc is removed and a data storage disc having no clock track thereon is substituted in its place. The copy of the master clock track is then read from the storage disc onto the data storage disc whereby the data storage disc will have been prepared with a clock track. In subsequent operations, the data storage disc is then placed upon a similar machine and an initial operation serves to read the clock track from the data storage disc onto a magnetic storage disc so as to record a copy of the clock track taken from the data storage disc. Thereafter, clocking information is read from the machine permanent storage while data information is transduced relative to data tracks on the data disc.

This invention relates to data storage apparatus and more particularly to that aspect of data storage system directed to the relocation of recorded data indicia to a more convenient location. The invention is particularly useful in the provision of timing indicia commonly referred to as clock pulses, or clocking indicia, and the following description is directed to this utility.

In data storage systems employing cyclic storage media such as drums, discs, or endless tapes, there has traditionally been required some suitable means for continuously generating timing signals to facilitate location and identification of information placed in storage on the cyclic medium.

Thus, so called "clock" pulses have been variously provided. One manner of generating these clock pulses is to establish a timing track adjacent the data tracks upon the cyclic medium. Thus, a cyclic or continuous sequence of recurring pulses are recorded which correspond to a predetermined subdivision, usually the smallest subdivision, of the data to be stored. Normally these subdivisions of the cyclic clock track correspond to a single data bit position. Thus, the bit clock is a cyclic track carrying a continuous series of pulses each of which occurs at that time in the rotation of the medium which corresponds to each bit position on the adjacent data tracks of the medium. The bit clock can therefore be used to time the bit positions of the data in the data tracks.

Larger subdivisions of the medium can be timed by recording one or more additional timing tracks for purposes of detecting the rotational position of these larger subdivisions. Using a disc, for example, the cyclic storage carrier can be subdivided into a number of sectors. Accordingly each pulse laid down in such a "sector clock" track corresponds to the sectors of the data tracks of the cyclic medium whereby a given sector can be located.

It will be readily evident that where a data storage medium such as a rotating disc carries information recorded in concentric data tracks thereon, the provision of one or more clock tracks recorded directly on the same disc will provide a precise timed relationship between the recorded information and the clock tracks. In order to utilize this, however, three transducers will need to cooperate with the disc if it is assumed that two transducers will be employed to read the two clock tracks, such as a bit clock track and a sector clock track. The third transducer, of course, will be available to read and record data and cooperate with the data storage tracks.

Such a three-head arrangement would require quite close tolerances in mounting the clock transducers. Furthermore, in the case of replaceable, interchangeable discs where the data storage disc is to be utilized on two or more machines, it is highly problematical that the adjustment of the two clock heads on the first machine would be the same as the adjustment of the two clock heads on the second machine. Furthermore, in placing the clock tracks on the same disc or drum as the data tracks, there is immediately raised the problem of the crowding caused by need to mount the two clock heads closely together.

More data can be stored using contact recording transducers as distinguished from those transducers which ride on an air or gas bearing in closely spaced relation from the record surface. Contact recording causes wear of the record surface. Therefore, should the clock track become worn out, the data stored on the rotating disc will be difficult to retrieve inasmuch as the clocking information that was previously precisely associated with this stored information is no longer available. To provide substitute clock timing associated in precise relation to the previously recorded data may be difficult.

For the foregoing reasons, as well as others which will be evident there is disclosed herein a clocking system wherein one or more clock tracks are recorded on a cyclic data storage medium and utilized in a manner which retains the same advantageous precise association between the timing pulses in the clock tracks and the recorded data in the data tracks, but which overcomes the foregoing and other problems.

In general it is an object of the present invention to provide an improved data transfer system relocating recorded indicia.

A further object of the invention is to provide a clocking system suitable for use with data storage systems wherein a replaceable storage medium may be utilized with one machine and then transferred to another machine without developing problems of timing caused by improper clocking.

A further object of the invention is the provision of a method of handling clocking indicia whereby a data storage record element, such as a disc or drum, can be utilized with a plurality of data storage machines.

A still further object is the provision of improved recorded clock means in a cyclic storage having the alignment precision of systems wherein timing indicia is located on a track adjacent to the data storage tracks.

These and other objects of the invention will be more readily apparent from the following detailed description of a preferred embodiment of the system when taken in conjunction with the drawings in which:

FIGURE 1 is a schematic perspective view of data storage apparatus in accordance with the invention;

FIGURES 2A and 2B comprise a block diagram arrangement of a clock transfer system in accordance with the invention;

Figures 1, 3:
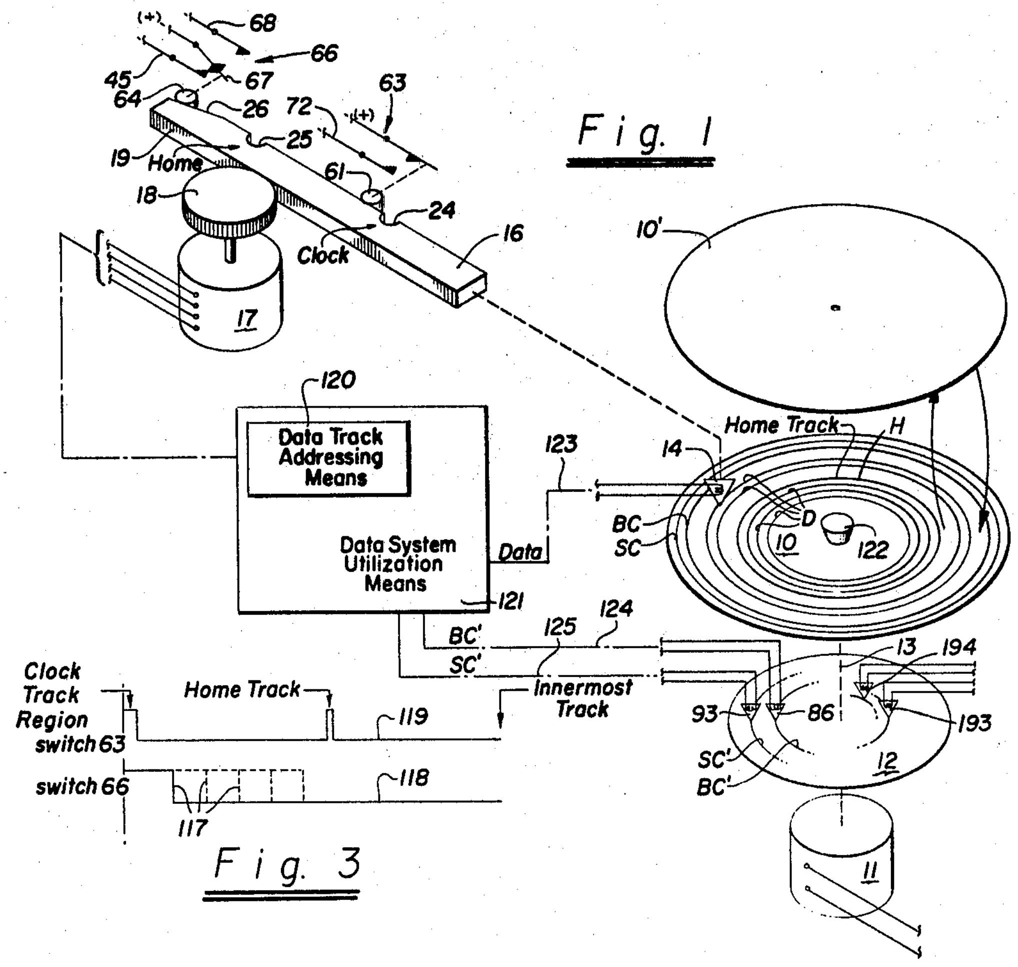
FIGURE 3 is a graph illustrating the functioning of home and clock track detecting means according to the invention.

Briefly stated the following procedure is employed with the apparatus disclosed herein. A custom clock pulse generator 110 (tailored to provide a clock pulse train corresponding to that of the data storage system employed by the prospective user of the disc storage apparatus), serves to record one or more clock tracks on a master clock disc. The master clock disc is then placed in a data storage apparatus as shown in FIGURE 1 and the clock tracks are read from the master disc 113 onto a permanantly installed clock disc 12 located in the data storage apparatus and schematically shown in the diagrams of FIGURES 5 and 6, as the disc 12'. The permanent disc 12' is mounted to rotate with the master disc. the latter rotating in the position of a replaceable storage disc.

The master clock disc is then removed from the data storage apparatus and it is replaced by a "fresh" data storage disc having no information whatsoever thereon. Subsequently, the recorded clock tracks on the permanent clock disc are read in precise synchronism onto the data storage disc 10' (FIGURE 6) whereby the replaceable data storage disc will receive a pre-recorded clock track. The data storage disc then is ready to be placed in operation in other data storage apparatus likewise employing a similar permanent clock disc. An initial operation of the apparatus when placed in use serves to transfer the clock information from the data storage disc onto the permanent clock disc of the using machine. All clocking information for the using machine is thereafter taken from its permanent clock disc 12.

From the foregoing brief description it will be apparent that the same high degree of synchronism between the timing pulses and the data pulses is retained as achieved by clocks read from the data discs themselves, but with the added advantage of freedom to locate the two clocking heads in a manner which avoids precision alignment. Furthermore, it will be apparent that virtually no wear will develop on the data storage disc inasmuch as the clock tracks recorded thereon are read only upon initially placing the apparatus in operation. If the permanent clock disc should become worn by the constant association of the stationary clocking heads thereon these clocking heads can be immediately relocated to a new radially displaced region of the permanent clock disc with a minimum of inconvenience.

As shown schematically in FIGURE 1 a data storage disc 10 includes a bit clock, BC and a sector clock SC recorded in the outermost pair of tracks. The bit clock track includes a continuous succession of equally spaced recorded timing pulses or other timing indicia. The spacing of these timing pulses is selected to establish the smallest subdivision of data, normally referred to as a "bit" which is to be recorded upon the data disc. One track spacing removed in an outwardly direction from the bit clock, BC another continuous succession of timing pulses, representing a larger subdivision of the data tracks or sector clock, SC is recorded. It will be evident that other timing data such as character clock tracks representing still further subdivisions of the disc and information thereon, can be recorded for those systems requiring same.

The data storage disc 10 is an interchangeable disc which can be readily removed from its operating spindle and, when in place, is driven by a drive motor 11. The knob 122 schematically represents any suitable means for readily coupling and decoupling either of two or more discs 10, 10' etc. to the drive motor 11, whereby the discs 10 can be selectively interchanged and placed in position to be driven. A permanently installed clock disc 12 is mounted to be rotated by the same drive spindle as drives disc 10 so that both data disc 10 and clock disc 12 are mechanically synchronized to rotate together about the axis 13.

Means are provided for positioning a magnetic recording transducer 14 radially of disc 10 so that it can read the timing indicia from bit clock BC or sector clock SC as well as record and read from data tracks disposed radially inwardly thereof. Thus an access arm 16 is schematically shown supporting transducer 14 and arranged to be driven by a stepping motor 17 operated for clock transfer by the—circuit described further below.

Stepping motor 17 rotates a pinion 18 selectively in either of two directions by discrete increments of displacement or "steps." Pinion 18 engages a rack 19 formed along one edge of access arm 16. Along the other edge of access arm 16 there is formed a clock track reference position detent 24 and a home track reference position detent 25. The two detents 24, 25 cooperate with a single cam follower element 61 as described further below which serves to control a switch associated with same. The rear end of access arm 16 is tapered to form a cam surface 26. Surface 26 cooperates with another cam follower element 64 also associated with a switch.

Figure 2A:
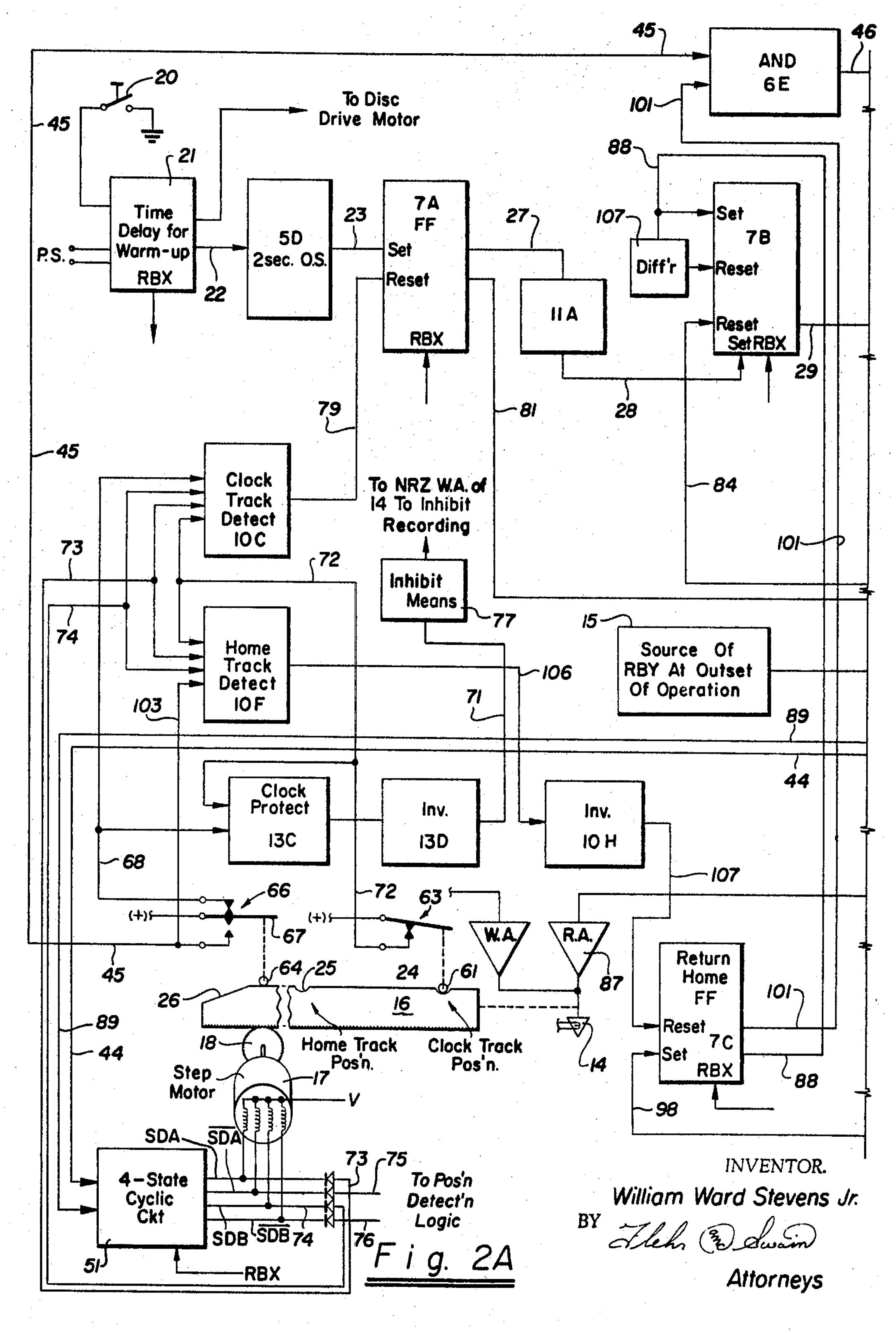
Figure 2B:
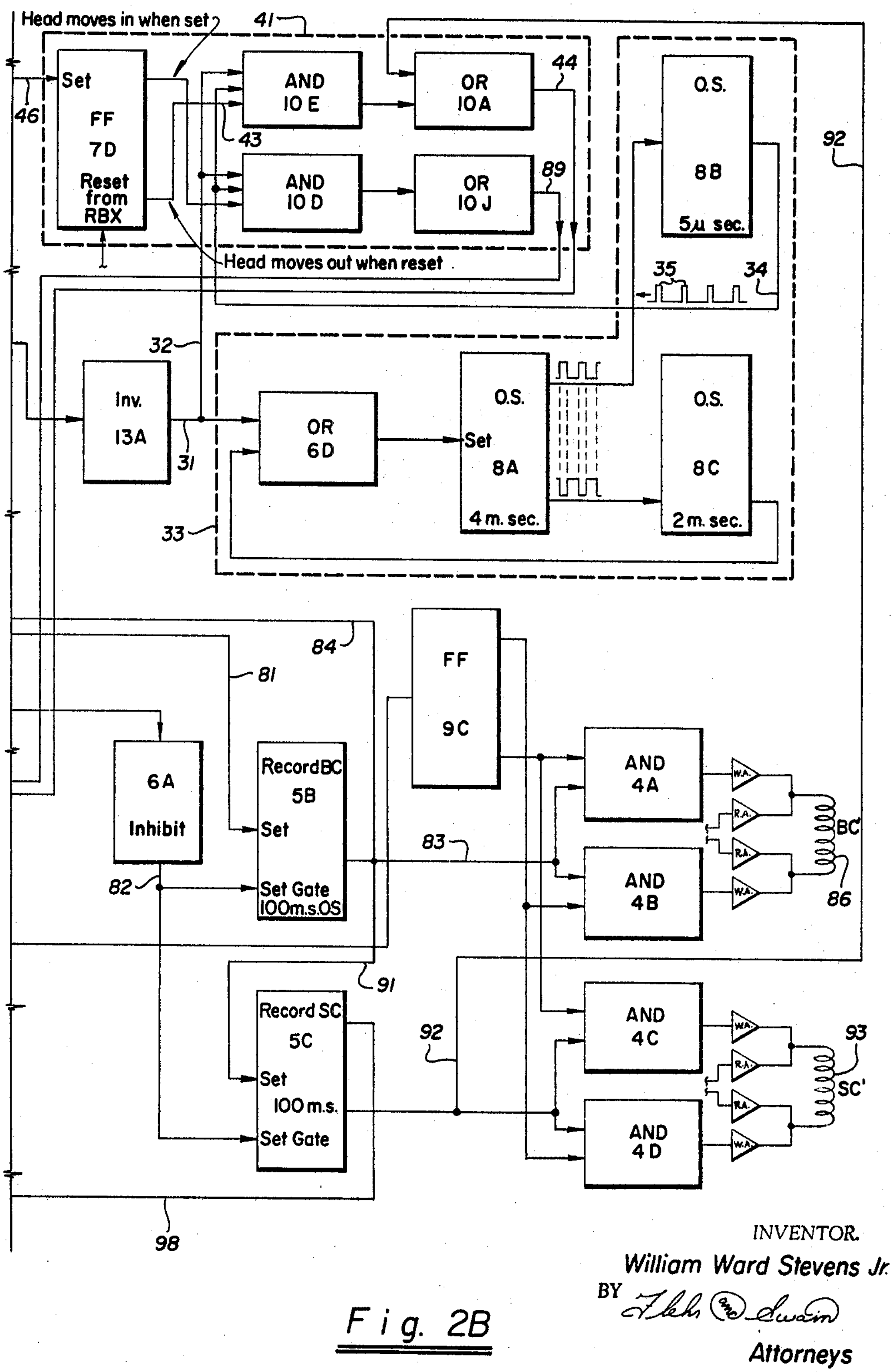

The operation of the apparatus schematically represented in FIGURE 1 is controlled by the circuit shown in block diagram form in FIGURES 2A and 2B.

It is the general function of the control circuit to effect a clock transfer function whereby the bit clock BC and sector clock SC are initially read from the data disc 10 onto the permanent clock disc 12 upon initially commencing operation of the equipment and at various times, as desired, during the later utilization of the apparatus.

It should initially be understood that the bit clock track BC and then sector clock SC respectively will be read from the data disc 10 and a representative copy of the timing indicia of BC and SC identified as BC', SC' will be recorded onto the permanently installed clock disc 12. Thereafter the transducer 14 cooperating with data disc 10 will be moved to a home track position, H, located preferably midway between the outermost and innermost data storage tracks D. This location of the home track H, serves to minimize the mean access time required to reposition the transducer 14 from one data track address to the next. Subsequent movement of arm 16 is under control of suitable data track addressing means 120.

The foregoing general objective, therefore, entails an initial movement of the transducer 14 to the bit block track BC; a reading off of BC onto the corresponding track BC' located on disc 12; repositioning of transducer 14 to sector clock SC; reading SC from disc 10 onto disc 12; and finally moving transducer 14 to the home track position H for subsequent cooperation with utilization means 121 in data storage handling procedures.

A detailed description of the system together with its operation will now be described commencing with the assumed condition that the apparatus has been plugged into a suitable power source, PS but has not been started. It will further be assumed that transducer 14 is positioned at the home track, H, or elsewhere over a data track, D, of disc 10, rather than over BC or SC.

The main power switch 20 is first closed and the apparatus gets up speed during a period of limited delay provided by suitable time delay warm-up means 21 of a construction whereby power is delivered to the disc drive motor 11 for a limited period sufficient to insure that the disc storage attains operating speed before initiating the clock transfer function. During this delay certain flip-flops (i.e. 7A, 7B, 7C, 7D) and the four state circuit 51 are reset by a long pulse applied to their respective reset lines as identified by the initials RBX. Previous to this, however, inhibit signal, RBY, from a suitable source 15, is fed to circuit 6A as will be referred to later below.

At the end of the initial time delay period, the one-shot 5D is triggered via a signal on line 22. The period of 5D lasts on the order of two seconds.

After two seconds, flip-flop 7A is set via line 23. Upon setting flip-flop 7A a signal on output line 27 is fed to a differentiator 11A. Differentiator 11A provides a momentary setting pulse on line 28 which sets flip-flop 7B to initiate the generation of a pulse train in a manner, and for purposes, now to be described.

Upon setting of flip-flop 7B the output via line 29 is inverted at 13A so as to provide one of two "enable" inputs to the AND gates 10E and 10D. Inverter 13A also triggers a pulse generator circuit 33. Generator circuit 33 provides a pulse train of five microsecond pulses 35 occurring at six millisecond intervals on the output line 34 of generator 33. As shown enclosed within its phantom boundary line, pulse generator 33 is started by the signal on line 31 which leads to an OR gate 6D. This signal serves to set the one-shot 8A having a four millisecond period. The two outputs of 8A carry signals of opposite state whereby as one goes relatively positive the other goes relatively negative. The trailing edge of one of the 4 m.s. signals turns on the one-shot 8C for its associated period of two milliseconds. Either the leading or trailing edge of the other 4 m.s. signal from 8A is fed to a one-shot 8B to trigger a five microsecond pulse to be amplified and used to drive stepping motor 17 as described later below. These pulses 35 are delivered on line 34. The trailing edge of the output from 8C serves to re-initiate the pulse generating cycle via OR gate 6D whereby the next pulse 35 is generated.

The pulse train on output lead 34 is fed to an access arm direction control circuit 41 wherein the pulse train is selectively gated to operate a cyclic four state drive circuit 51 in one of two opposite sequentially arranged cyclic states. Circuit 51 drives the stepping motor 17 which positions the access arm 16 carrying transducer 14. As explained further below circuit 51 serves to generate a cyclically repeated sequence of four states. The sequence can be controlled to proceed in either of two opposite directions depending on whether movement of transducer 14 is to be inwardly or outwardly on disc 10.

It will be recalled that at the outset flip-flop 7D was reset by an RBX signal. This initial reset function conditioned the output 43 to provide a second enabling input to AND gate 10E. Further, gates 10D and 10E are both now receiving an enabling input via line 32 by the conditioning of inverter 13A. The output pulse train on line 34 will therefore be fed via AND gate 10E, through OR gate amplifier 10A, and onto lead 44 to provide an output pulse train which causes the transducer 14 to be moved toward the periphery of disc 10.

Lead 44 feeds the pulse train to circuit 51.

The four output lines from circuit 51 are coupled to the four windings of a stepping motor 17, and serve to advance stepping motor 17 a fraction of a revolution in response to each change in state of circuit 51. Preferably, circuit 51 comprises a pair of flip-flops utilizing transistors with the collector impedance provided by the step motor windings. Two of the windings will be selectively grounded as determined by the particular state. A suitable drive arrangement of the known type using a counter coupled so as to cycle the windings of a stepping motor may be employed.

Thus, the pulses appearing on lead 44 serve to drive stepping motor 17 via four-state circuit 51 in a squence selected to move the transducer 14 toward the perimeter of disc 10. Movement toward the periphery of disc 10 will continue until transducer 14 is located on the BC clock tracks of disc 10. The BC track is next adjacent the outermost track SC, and constitutes a bit clock track.

Means are provided for sensing the arrival of transducer 14 at the BC track and for arresting its movement thereat. In general the position of track BC is sensed by mechanical switch means such as the feeler 61 with the precise position of track BC being defined by means of a predetermined state of the circuit 51.

When the access mcehanism moves toward the periphery of disc 10 eventually the feeler 61 will sense the clock position detent 24 thereby transferring switch 63 to closed condition. Prior to this time the tapered end 26 of access arm 16 will have engaged feeler 64 to transfer the switch 66 sufficiently to move the switch armature 67 to connect with a lead 68 coupled to a control signal, such as a source of potential shown by the plus sign, (+).

This AND relationship serves to discriminate between the general positioning of transducer 14 in the region of BC–SC as distinguished from positioning transducer 14 to home track, H. Thus, clock track detecting circuit 10C has been partially conditioned by two of its four coincident inputs. For final, prevision positioning of head 14, detent 24 is dimensional to accommodate the aggregate movement resulting from four increments of displacement of pinion 18 without causing feeler 61 to break contact.

One input is supplied via lead 68 representing the presence of transducer 14 in the outer radial zone of disc 10. Another is provided via lead 72 emanating from closure of switch 63. The other two inputs 73, 74 come from circuit 51 as SDA and SDB signals respectively from the two flip-flops which preferably comprise circuit 51. Thus, the output of circuit 51 can establish four states: (1) SDA & SDB, (2) $\overline{\text{SDA}}$ & SDS, (3) $\overline{\text{SDA}}$ & $\overline{\text{SDB}}$, (4) SDA & $\overline{\text{SDB}}$, one of which is selected to be ANDed with the other two inputs entering the clock track detecting circuit 10C, via leads 73, 74. (The overscoring represents an inverse or "not" function of the flip-flop.) Diode isolation is shown whereby the same outputs of circuit 51 serve to drive motor 17.

When the four inputs to clock track detector gate 10C are satisfied the stepper 17 is arrested as follows.

An output signal via line 79 serves to reset flip-flop 7A. As 7A is reset a signal is provided on line 81. Line 81 is coupled to a single shot circuit 5B having a period on the order of one hundred milliseconds or greater. The signal on line 81 provides a set trigger signal to 5B. Upon its coincidence with a set gate signal via line 82 (which set gate signal is always present except during initial turn-on time when RBY is on the input to 6A), the output line 83 of 5B will be conditioned to reset flip-flop 7B via lead 84. Reset 7B disables gate 10E by removal of one of its two enabling inputs. When gate 10E is disabled, the pulse train on line 34 will no longer be delivered to the lead 44 whereby to advance the circuit 51 and motor 17. Thus, drive motor 17 will be arrested with transducer 14 properly located at the bit clock track BC.

If, of course, the transducer 14 is already at the perimeter of disc 10 it would not be necessary to energize the stepping motor and the reset signal on line 79 would serve to preclude movement of motor 17 in the manner just mentioned.

Switch 63 schematically represents the bi-stable switching states of a flip-flop which can be interposed to switch between "on" and "off" condition. Use of a flip-flop will avoid difficulties of contact bounce and similar mechanical problems. Similarly switch 66 represents the bi-stable conditions of another flip-flop wherein, for example, the upper contact of switch 66 provides an output signal representing the "set" state and the lower contact represents an output signal for the "reset" state.

As mentioned, detent 24 is adequately dimensioned to accommodate movement representing four increments of displacement of pinion 18. In this general region of the clock tracks, means are provided to protect against inadvertently recording pulses into the midst of the clock tracks BC, SC by head 14.

In this clock region and AND function is sensed by AND gate 13C which provides an output through inverter 13D that is fed via lead 71 to suitable inhibit means 77 so as to preclude recording by write amplifiers (W.A.) associated with transducer 14 and thereby protect the clock tracks against inadvertent recording of pulses.

The signal on line 83 which served to terminate the step motor movement (via line 84), also serves (on line 83) to commence recording BC onto permanent clock disc 12 located beneath replaceable disc 10. Thus, the output on line 83 further serves to enable a pair of AND gates 4A and 4B which control the NRZ recording transducer 86 cooperatnig with disc 12 thereby laying down bit clock track BC′ on the permanent clock disc.

Inasmuch as NRZ recording is shown as being employed, the read head signal is fed to a read amplifier (R.A.) 87 and then to a flip-flop 9C. The two output states of 9C serve respectively to control AND gates 4A and 4B when ANDed with signals via line 83. The NRZ output of gates 4A, 4B is amplified by suitable write amplifiers (W.A.) associated with the BC′ recording head 86.

Recording commences simultaneously with arresting of motor 17, as initiated by the output of 5B. In order to give read head 14 several revolutions of disc 10 in which to settle down and read out an accurate clock track, the duration of the period for one-shot circuit 5B is on the order of at least 100 milliseconds, or longer. At the end of this period, circuit 5B resets thereby disabling AND gates 4A, 4B to terminate writing of the BC′ track. Tracks BC and BC′ are to be understood as being identical in all respects except that BC is disposed on disc 10 and BC′ on disc 12.

Sector clock SC is now to be transferred. The trailing edge of the enabling signal on lead 83, which occurs as 5B resets, serves, via lead 91, to set a one-shot circuit 5C to record the sector clock track, SC, as now to be described.

The sector clock track, SC, is the outermost track on the replaceable disc.

The firing of one shot 5C provides a control signal whereby transducer 14 will be stepped outwardly to the sector clock position, SC. More particularly, the firing of one-shot 5C serves to provide a negative voltage level on the output 92 which in turn is fed into amplifier gate 10A to advance circuit 51 one more count in the same direction (outwardly) as achieved earlier by the pulse train on line 44.

The write amplifiers controlled by AND gates 4C, 4D were also enabled with the firing of one-shot 5C so that a sector clock, SC′, is recorded on the permanent disc 12 by head 93. Thus, the track SC′ corresponds to SC as read from the replaceable disc by transducer 14.

While it will be noted that head 14 is moving during a portion of the time that the sector clock is being laid down, the sector clock track, SC′, may be written at a substantial radial as well as angular distance removed from the bit clock, BC′. The radial movement of the read head 14 during the commencement of writing of the sector track SC′ is of no moment inasmuch as one-shot 5C stays "on" for a period on the order of 100 milliseconds or greater to permit head 14 to settle down and read off an accurate sector track.

The movement of read head 14 to the home track position proceeds as now to be described.

Means are provided responsive to both the position of arm 16 and the completion of the transfer of both clock tracks onto disc 12 whereby direction control circuit 41 will be reversed.

Thus, a two-input AND gate 6E receives a signal via line 45 indicative of the fact that arm 16 is in the region of the clock tracks. Feeler 64 is in its upper position whereby the lead 45 is at open circuit with respect to switch armature 67. As will be recalled, this open circuit represents the "not" function output state of a flip-flop.

Ultimately, the one-shot 5C will turn off whereby the output state of line 98 provides a set trigger pulse to set the return home flip-flop 7C. Flip-flop 7C, when set, initiates radially inward movement of read head 14 toward its home track position, H, where subsequent data reading and writing operations can be commenced.

Setting of flip-flop 7C activates means to gate out the continuing pulse train from pulse generator 33 whereby access arm 16 is driven clear of the region of the clock tracks to the predetermined home track for initiating data transducing operations.

More particularly it is a present objective that the direction control circuit 41 be reversed by setting the direction control flip-flop 7D. This action will supply one of two enabling signals to AND gate 10D and will disable AND gate 10E. Further, line 32 is to be conditioned to gate out the pulse train being generated on line 34.

Gate 6E receives its other input from line 101 in response to the set trigger signal on line 98 indicative of the end of clock transfer. As thus arranged flip-flop 7D will be set via line 46 whereby gate 10D receives one of its two enabling inputs.

(Direction control flip-flop 7D, as has been seen, when originally reset, provided one of two inputs necessary to enable AND gate 10E to drive head 14 outwardly.)

Means are provided to supply the other enabling input to 10D and thereby gate out the pulse train from generator 33 to the stepping motor 17 via amplifier 10J.

As will be recalled the other input to gates 10D, 10E is supplied by a step function which is present via lead 32 from inverter 13A only so long as flip-flop 7B is in its set condition. Previously, this was accomplished by a momentary set signal on line 28. However, when the recording of the clock tracks commenced, one-shot 5B served to reset flip-flop 7B via line 84 thereby transferring 7B to the reset condition which still exists at this point.

A set signal is received by flip-flop 7B via lead 88 in response to the set trigger signal on line 98 after the end of the clock transfer onto disc 12. As 7B is now set, clock pulses 35 are gated via line 89 to circuit 51. Line 89 enters circuit 51 so as to cycle the four states of the two flip-flops therein in a reverse sequence to that sequence followed when the pulse train enters via line 44. Thus, the stepping motor 17 is reversed.

Means are provided which serve to sense the precise arrival of head 14 at a home track radially displaced from the clock track region of BC, SC.

A home track detector circuit comprising the four input AND gate 10F serves to reset the return home flip-flop 7C thereby arresting further movement of access arm 16 as now to be described.

It will be observed that arm 16, when it moves to the right as shown in FIGURE 2A, will cause feeler 64 to transfer the switch armature 67 to provide an input signal to AND gate 10F via lead 103. Another input is provided to AND gate 10F via lead 72 when feeler 61 drops into home detent 25.

As in the case of detent 24, detent 25 is dimensioned sufficiently to accommodate the aggregate movement of four increments of rotation of pinion 18 whereby one of the four cyclic states of circuit 51 can provide the final precision positioning of arm 16. Thus when a predetermined one of the four cyclic states of circuit 51, for example, SDA plus SDB, appears on line 73 and 74 respectively, the AND gate 10F will provide an output on line 106 which is fed to an inverter 10H and via lead 107 serves to reset the return home flip-flop 7C.

Further movement of access arm 16 will be arrested by removing the enabling state on line 32. Thus when return home flip-flop 7C is reset by the satisfied condition of home track detector gate 10F the transition of the signal on line 88 from the set to reset stable states of flip-flop 7C is differentiated by circuit 107 and a reset pulse applied to flip-flop 7B. This reset pulse disables AND gates 10D, 10E so that the pulse train on line 34 is no longer rated out to the cyclic four state circuit 51.

At this point a complete clock transfer function has been achieved and data will be fed to suitable utilization means 121, such as a computer or data handling system, along path 123 while the clocking is provided from paths 124, 125.

The foregoing arrangement has special utility in providing a customer's machine with a data storage disc carrying a clock track unique to his own system of data recording, and which also preserves and safeguards a master clock for reading reference.

As is known, data storage discs, and the information thereon, are broken down into various segments variously referred to as sectors, records, characters, and bits of information. Suffice it to say that these subdivisions can be established by a given system of data recording in a substantially arbitrary fashion whereby, for example, a character may be defined as including any selected number of smaller subdivisions each represented by the presence or absence of a data bit.

Therefore, in order to provide each customer with data storage discs carrying a clock track design to his own specification, a custom clock pulse generator 110 serves to provide a pulse train corresponding to the clock system desired. A write amplifier 111 receives the pulse train and records it by a recording transducer 112 upon a master clock disc 113. The master clock disc is then used to prepare data storage discs such as disc 10 mentioned above in the foregoing detailed description.

Figure 5:
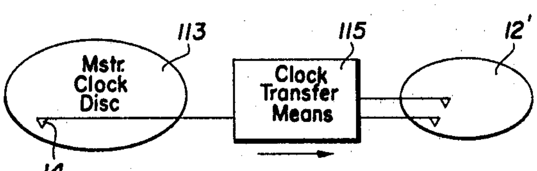
FIGURES 4, 5 and 6 are diagrammatic illustrations demonstrating the method of providing a data storage medium with clocking information according to the invention.
Figure 4:
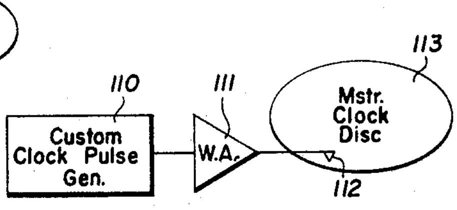
Figure 6:
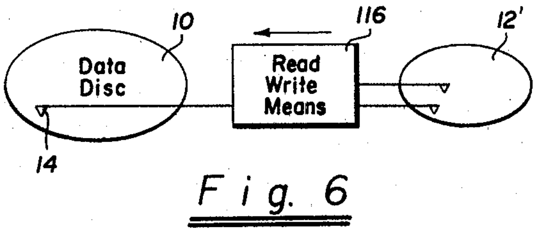

Master clock disc 113 is placed in position on the apparatus schemically shown in FIGURE 1 and the clock track or tracks read off onto the permanent clock disc 12 by clock transfer means, for example as described in FIGURES 2A and 2B, referred to simply in FIGURE 5 by the clock transfer means 115. Subsequently the master clock disc 113 is removed and placed in safe keeping storage and otherwise generally given special protection so as to preclude damage.

Following removal of master clock disc 113, a "fresh" data disc 10 having no clock track whatsoever thereon nor any other recording, is placed upon the apparatus shown in FIGURE 1. Subsequently, the clock tracks which are temporarily stored on permanent disc 12 in something of a buffer storage, are read out by suitable clock reading and writing means 116 whereby the clock is transferred to the fresh data storage disc 10.

For example, as shown in FIGURES 2A and 2B read amplifiers R.A. are associated with each of the fixed heads 86, 93 and a write amplifier W.A. associated with transducer 14. In this manner the clock reading and writing means 116 serves to transfer the timing indicia from disc 12 onto data storage disc 10.

After the clock tracks have been applied to the data storage disc 10 it is then ready to be forwarded to the customer for use in his particular system.

The customer then instals the replaceable data disc upon his own data storage apparatus and, upon commencement of data handling procedures an initial operation will be the transfer of the clock tracks from the data storage disc down onto the permanent clock disc 12 of his storage apparatus. Subsequently, all clocking information will be taken from the permanent clock disc 12 of his equipment, thereby saving considerable wear upon the clock tracks BC and SC.

From the foregoing it will be readily evident that there has been provided a clock transfer procedure and system having a number of advantages.

One advantage of the apparatus described above is demonstrated in FIGURE 3 wherein it can be observed that the location of the camming element or feeler 64 of switch 66 is not a critical adjustment inasmuch as the feeler 64 can be positioned anywhere within a wide range of positions indicated by the step 117 shown in both full and dotted lines in FIGURE 3. The lower trace 118 in FIGURE 3 represents the condition of switch 66 during an initial state thereof shown in FIGURE 2A. As feeler 64 moves downwardly on ramp 26 the change of state representing the step shown in trace 118 will occur. Inasmuch as switch 66 need only define generally when transducer 14 is located inwardly or outwardly of the home track position, H, it can be located at a wide range of positions.

The upper trace 119 in FIGURE 3 similarly represents the two states of switch 63. Only the installed location of the feeler for switch 63 wil have to be carefully made in order that detent 24 engages the feeler 61 when transducer 14 is located in the clock track region. Detent 25, of course, can be readily machined a predetermined spaced distance from detent 24 in order to define the radial displacement between the home track and clock track positions. Accordingly installation and adjustment is readily facilitated in this maner.

Other advantages of the above system will be apparent in that far less wear on the clock track on the data storage disc will occur. Furthermore should the clock track of the permanent disc become worn the stationary heads cooperating with the permanent disc can merely be moved to a new radial position and thereby loss of the replaceable data storage disc 10 will be avoided.

A still further advantage of the foregoing system is that the clocking heads 86, 93 can be disposed in a controlled environment so as to preserve and enhance accuracy of the clocking pulses.

Also, the clocking heads of disc 12 do not need to be located in cramped quarters nor given any precision alignment relative to each other.

While it was not specifically mentioned above each of the discs referred to is prepared with a magnetic recording surface for cooperation with their associated transducers.

Where a home track position is not to be employed, the input to 10C from switch means 66 can be removed and 10C adjusted whereby 10C is responsive to only the coincidence of one of the states of drive circuit 51 and the sensing of detent 24 by feeler 61 whereby stepping movement will be arrested. In short, without a home track, there is no need for the input to 10C from switch means 66.

As noted at the outset above the present data storage system permits the relocation of recorded data indicia to a more convenient location for utilization. The data indicia need not necessarily be restricted to timing indicia but can include all manner of information. For example, with the provision of additional stationary transducer heads 193, 194 associated with the permanently installed disc 12, heads 193, 194 can be used to transfer summary information to a track of disc 12 whereby the summary track constitutes an information register for such things as salesmen's commissions, sales tax, running totals or other items, etc.

In this manner, the summary register would be available for repeated access merely by electronic switching and would not include the delay of the mechanical head movement. The summary register track on disc 12 as laid down by a head such as 193, 194, or the like would be available for updating and could be transferred back to the replaceable disc or to other tracks on the permanent disc as desired.

The apparatus as disclosed herein can also be utilized in providing a storage location capable of quick access for certain high use information. For example, interest tables, scientific data, and other information which might be repeatedly referred to can be located conveniently on the permanent disc and transduced by stationary heads such as heads 193, 194.

Furtherfore, the foregoing system can utilize the replaceable disc as an input device to an otherwise permanent disc storage as by reading off both the data and clocking information from the replaceable disc 10 into the permanent disc 12. In this instance the permanent disc 12 may appropriately incorporate one stationary head associated with each recording track position thereon. It will be apparent that the heads on disc 12 need not be radially aligned but can be disposed in any convenient location.

I claim:

1. In a data storage apparatus the combination comprising a movable transducer, a cyclically moving record surface cooperating with said transducer, means for cyclically and repetitively presenting to said transducer a predetermined series of data indicia derived from said moving record surface, means to utilize said indicia, another transducer, another record surface mechanically synchronized to move with the first named record surface and cooperating with the last named transducer, and means cooperating with said first and second named transducers for sensing said indicia and recording representations thereof onto said last named record surface, said last named surface thereafter cyclically and repetitively presenting said representations to the last named transducer for transmission to said utilization means while said first named transducer is moved to cooperate with other portions of its associated record surface.

2. In a data storage apparatus the combination comprising a cyclically moving record surface including data storage tracks and a timing track defined thereon and arranged in side by side relation, a transducer movable to cooperate with said data tracks and said timing track, said timing track including predetermined data timing indicia with respect to data recorded in said data tracks, means to utilize said indicia and said data, another record surface mechanically synchronized to move with the first named record surface, a stationary transducer cooperating with the last named record surface, and means cooperating with both said transducers for sensing said indicia and recording representations thereof onto said last named record surface, said last named surface thereafter cyclically and repetitively presenting said representations to the last named transducer for transmission to said utilization means, said movable transducer then being free to move to cooperate with said data storage tracks.

3. In a data storage apparatus the combination comprising a data storage medium adapted to be cyclically driven continuously in a given direction and including data storage tracks and a timing track thereon arranged in side by side relation, said timing track including predetermined data timing indicia cooperatively disposed with respect to data to be recorded in said data tracks, means to drive said medium in said direction, means serving to readily releasably couple said medium to said drive means and serving to permit said medium to be readily removed from the apparatus and be replaced by another said medium in position to be driven by said drive means, a transducer movable to cooperate with said data tracks and said timing track, means to utilize said indicia and data derived from said tracks, a recording medium adapted to carry timing information thereon and mechanically synchronized to move with the first named storage medium when the latter is being driven, a stationary transducer cooperating with the recording medium, and means cooperating with both said transducers for sensing said timing indicia and recording a representative copy thereof onto said last named medium, said recording medium thereafter presenting said representative copy of the timing indicia to the last named transducer to be cyclically and repetitively fed to said utilization means, said movable transducer then being free to move to cooperate with said data storage tracks while said copy of the timing indicia provides timing indicia correlated with same.

4. In a data storage apparatus the combination comprising a first and second data storage medium each adapted to be driven cyclically continuously in a given direction, each said medium including data storage tracks and a timing track arranged in side by side relation, the timing track including predetermined data timing indicia cooperatvely disposed with respect to data to be recorded in said data tracks, drive means for driving one of said storage media in said direction, means for readily coupling and decoupling either of said media to said drive means for selectively interchanging said media into driving relation with said drive means, a transducer movable to cooperate with said data tracks and said timing track of that one of said media coupled to said drive means, means to utilize said indicia and data derived from said tracks, a recording medium adapted to carry timing information thereon and synchronized to move with said one of said media, a transducer cooperating with the recording medium for writing and reading with respect to same, and means cooperating with both said transducers for reading said timing track and recording a representative copy thereof onto said last named recording medium, said recording medium thereafter cyclically and repetitively presenting said representative copy of the timing track to the last named transducer to be fed to said utilization means, said movable transducer then being free to move to cooperate with said data storage tracks while said copy provides timing indicia correlated with same.

5. Data storage apparatus according to claim 4 wherein said first and second media are formed as discs having a magnetic recording surface on at least one side thereof, said discs being readily engageable with and removable from said drive means to permit interchangeability therebetween, and wherein the recording medium adapted to carry timing information comprises a disc having a magnetic recording surface on at least one side thereof, the last named disc being permanently installed to be driven by the same said drive means.

6. In a data storage apparatus the combination comprising a rotating disc having a magnetic record surface thereon including data storage tracks an at least two timing tracks defined thereon, said timing and storage tracks being arranged in lateral association therebetween, a first transducer selectively movable to cooperate with said data tracks and both said timing tracks, said timing tracks including predetermined data timing indicia with respect to data recorded in said data tracks, means to utilize said timing indicia and said data, another disc having a record surface thereon, said last named disc being mechanically synchronized to move with the first named disc, a second and third transducer stationary and each cooperating with separate paths on the record surface of the last named disc, means for positioning said first transducer to cooperate with one of said timing tracks, means operatively associating said first transducer with said second transducer to read said one of said timing tracks and record a representative copy of the indicia thereof onto said last named disc, means serving to re-position said first transducer to cooperate with the other timing track, and means serving to operatively associate said first transducer with said third transducer to read said other timing track and record a representative copy of the indicia thereof onto said last named disc, and means serving to reposition said first transducer away from said timing tracks thereafter.

7. Data storage apparatus according to claim 6 wherein said first named record surface further includes a home track spaced laterally from said timing tracks, and wherein means are provided serving to reposition said first transducer to said home track upon sensing completion o^c^ the recording of said copy of the last named timing track onto the last named record surface.

8. Data storage apparatus according to claim 6 wherein there is further provided means serving to sense relocation of said first transducer in cooperative relation with respect to said timing tracks and to inhibit recording of signals into the path thereof via said first transducer.

9. Data storage apparatus according to claim 6 further including means for driving both said discs at the same rotational speed.

10. Data storage apparatus according to claim 9 wherein both discs are mounted on the same axis of rotation.

11. Data storage apparatus according to claim 6 wherein said means for positioning and re-positioning said first transducer includes an access arm supporting said first transducer, reference means physically associated and movable with movement of said arm and defining generally that position of said arm serving to position said first transducer in the region of said timing tracks, first sensing means serving to sense said reference means and give an indicative signal thereof, motive means coupled to drive the arm and including a drive circuit serving to generate a cyclically repeated sequence of states thereof, each state serving to advance said motive means an increment of displacement thereof, and means responsive to coincidence of both a predetermined one of said states and the indicative signal of said first sensing means to arrest further movement of said arm, whereby the coincidence of said predetermined one of said states and said indicative signal identifies one of said timing tracks.

12. Data storage apparatus according to claim 11 wherein said repositioning means includes means serving to advance said drive circuit to the next succeeding state thereof, the last named means being operatively responsive to the termination of the recording of the representative copy of said one of the timing tracks.

13. In data storage apparatus having a rotating recording disc prepared with data storage tracks and a timing track thereon arranged in side by side relation wherein the timing track includes predetermined data timing indicia cooperatively disposed with respect to data to be recorded in the data tracks, the combination comprising a movable access member, a transducer supported by said member for cooperation with said disc, reference means movable with movement of said member and defining generally that position of said member serving to position said transducer in the region of said timing track, first sensing means serving to sense said reference means and give an indicative signal thereof, motive means coupled to drive the member and including a drive circuit serving to generate a sequence of cyclically repeated states thereof, each state serving to advance said motive means an increment of displacement thereof, and means responsive to coincidence of both a predetermined one of said states and said indicative signal to arrest further movement of said member whereby said coincidence identifies said timing track.

14. Data storage apparatus accordng to claim 7 wherein said means for positioning and repositioning said first transducer includes an access arm supporting said first transducer, first reference means movable with movement of said arm and defining generally that position of said arm serving to position said first transducer in the region of said timing tracks, second reference means movable with movement of said arm and defining generally that position of said arm serving to position said first transducer in the region of said home track, first sensing means disposed to sense both said first and second reference means and provide an indicative signal thereof common to each, second sensing means disposed to cooperate with movement of said arm and switch from a first state to a second state at a point in the movement of said arm from said timing track region to said home track region, said point lying between said regions, motive means coupled to drive said arm and including a drive circuit serving to generate a cyclically repeated sequence of states thereof, each state serving to advance said motive means an increment of displacement thereof, and means responsive to coincidence of a predetermined one of said cyclically repeated sequence of states, the indicative signal, and said first state of said second sensing means to arrest movement of said arm and define one of said timing tracks, and means responsive to coincidence of a predetermined one of said cyclically repeated sequence of states, the indicative signal, and said second state of said second sensing means to arrest movement of said arm and define the home track position.

15. In data storage apparatus having a rotating recording disc prepared with data storage tracks and a timing track thereon arranged in side by side relation wherein the timing track includes predetermined data timing indicia disposed with respect to data recorded in the data track, the combination comprising a movable access member, a transducer supported by said member in cooperation with said disc, first reference means movable with movement of said arm and defining generally that position of said arm serving to position said transducer in the region of said timing track, second reference means movable with movement of said arm and defining generally that position of said arm serving to position said transducer in the region of said home track, first sensing means disposed to sense both said first and second reference means and provided an indicative signal thereof common to each, second sensing means disposed to cooperate with movement of said arm and switch from a first sensing state to a second state at a point in the movement of said arm between said timing track region and said home track region, motive means coupled to drive said arm and including a drive circuit serving to generate a cyclically repeated sequence of states thereof, each state serving to advance said motive means an increment of displacement thereof, and means responsive to coincidence of a predetermined one of said cyclically repeated sequence of states, the indicative signal, and said first state of said second sensing means to arrest movement of said arm to define said timing track, means serving to direct said motive means to move said arm to said home track position, and means responsive to coincidence of a predetermined one of said cyclically repeated sequence of states of the drive circuit, the indicative signal, and said second state of said second sensing means to arrest movement of said arm to define the home track position.

16. The method of providing data storage systems with a cyclically recurring predetermined sequence of timing pulses for correlating recorded data therewith in the storage system comprising the steps of generating a predetermined train of timing pulses, rotating a master recording disc at a predetermined speed about a given axis of rotation, writing said pulses onto said master recording disc at a predetermined radius from said axis through at least one complete revolution thereof while the master disc is rotating at said speed to record a master clock track thereon, coupling said master disc to rotate with a recording disc, rotating said master and recording discs at a given speed, reading said pulses from said master clock track during rotation thereof at said given speed and writing a representative copy of the master clock track onto said recording disc, sudbstituting a data storage disc for the master clock disc and coupling the storage disc to rotate with said recording disc, rotating said data storage disc and recording disc at said given speed, reading said representative copy from said recording disc, and writing a representative copy of the last named copy onto said data storage disc.

17. In data storage apparatus composite timing means comprising the combination of a data storage disc prepared with data tracks thereon, and a magnetically recorded timing track laterally associated with said data tracks, said timing track including cyclically recurring predetermined data timing indicia, a magnetic recording disc coupled to be driven about the same axis of rotation as said storage disc and with said storage disc, and a representative copy of said timing track recorded on the last named disc, the remainder of said disc being substantially free of other recorded tracks thereon.

18. In a data storage apparatus the combination comprising a transducer, a first cyclic moving record track cooperating with said transducer, means for repetitively presenting to said transducer a predetermined series of data indicia derived from said track, means to utilize said indicia, another transducer, a second cyclic moving record track mechanically synchronized to move with said first track and cooperating with the last named transducer, and circuit means cooperating with both said transducers for sensing said indicia in said first track by first named transducer and recording representations thereof into said second track via the other transducer, said second track thereafter cyclically and repetitively presenting said representations to the last named transducer for transmission to said utilization means.

References Cited

UNITED STATES PATENTS

| | | | |
|---|---|---|---|
| 2,622,155 | 12/1952 | Dutton | 179—100.2 |
| 2,890,288 | 6/1959 | Newman | 179—100.2 |
| 3,185,972 | 5/1965 | Sippel | 340—174.1 |
| 3,229,269 | 1/1966 | Namengi-Kart | 340—174.1 |
| 3,263,031 | 7/1966 | Welsh | 340—174.1 |
| 2,850,720 | 9/1958 | Oliws et al. | 340—174.1 |
| 2,903,677 | 9/1959 | Curtis | 340—174.1 |
| 3,156,906 | 11/1964 | Cummins | 340—174.1 |
| 3,195,118 | 7/1965 | St. Clair | 340—174.1 |
| 3,196,420 | 7/1965 | Francois | 340—174.1 |

OTHER REFERENCES

"Writing at Closed Clock Tracks," H. A. Ferrier; March 1963, IBM Technical Disclosure Bulletin, vol. 5, No. 10, p. 72.

BERNARD KONICK, Primary Examiner

V. P. CANNEY, Assistant Examiner

U.S. Cl. X.R.

179—100.2